(12) United States Patent
Nishijima et al.

(10) Patent No.: US 6,308,128 B1
(45) Date of Patent: Oct. 23, 2001

(54) DRIVING FORCE CONTROL FOR AUTOMOTIVE VEHICLE

(75) Inventors: Hiroaki Nishijima, Yokohama; Nobusuke Toukura, Kanagawa; Masayuki Yasuoka, Yokohama, all of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/521,887

(22) Filed: Mar. 9, 2000

(30) Foreign Application Priority Data

Mar. 16, 1999 (JP) .................................. 11-069523

(51) Int. Cl.⁷ .................................................. F16H 61/10
(52) U.S. Cl. ................................ 701/93; 701/70; 180/170
(58) Field of Search ................................ 701/93, 94, 70, 701/54; 180/170

(56) References Cited

U.S. PATENT DOCUMENTS

| 5,038,880 | * | 8/1991 | Matsuoka et al. | 180/179 |
| 5,197,564 | * | 3/1993 | Nishimura et al. | 180/179 |
| 5,557,519 | * | 9/1996 | Morita | 701/1 |
| 5,845,726 | * | 12/1998 | Kikkawa et al. | 180/178 |
| 5,925,087 | * | 7/1999 | Ohnishi et al. | 701/70 |
| 5,961,566 | * | 10/1999 | Heslop | 701/93 |
| 6,029,107 | * | 2/2000 | Sato | 701/58 |
| 6,076,032 | * | 6/2000 | Kuroda et al. | 701/54 |
| 6,104,976 | * | 8/2000 | Nakamura | 701/95 |
| 6,188,945 | * | 2/2001 | Graf et al. | 701/58 |

FOREIGN PATENT DOCUMENTS

| 7-174042 | | 7/1995 | (JP) . |
| 09207735 A | * | 8/1997 | (JP) . |
| 9-242862 | | 9/1997 | (JP) . |

* cited by examiner

*Primary Examiner*—Michael J. Zanelli
*Assistant Examiner*—Eric M Gibson
(74) *Attorney, Agent, or Firm*—Foley & Lardner

(57) ABSTRACT

A driving force control system for an automotive vehicle comprises an ordinary target driving force generator. It determines an ordinary target driving force in response to operator manipulation of the accelerator pedal and vehicle speed. The ordinary target driving force is a predetermined target value of driving force required to keep the vehicle rolling over the surface of a flat road that has 0% gradient. A running resistance increment generator determines an increment in running resistance from a standard resistance that is predetermined for the vehicle. A corrected target driving force generator receives the ordinary target driving force, the vehicle speed and the running resistance increment. It determines corrected target driving force. The corrected target driving force generator restrains the corrected target driving force in response to idle and brake signals from an idle switch and a brake switch.

11 Claims, 9 Drawing Sheets

DRIVING FORCE CONTROL FOR AUTOMOTIVE VEHICLE

FIELD OF THE INVENTION

The present invention relates to a driving force control for an automotive vehicle.

BACKGROUND OF THE INVENTION

The term "standard resistance" or "standard running resistance" is herein used to mean any force which opposes the motion of an automotive vehicle which is driven to keep rolling over the surface of a flat road having 0% gradient at a constant vehicle speed. The term "running resistance" is herein used to mean any force which opposes the motion of an automotive vehicle which is driven to keep rolling over the surface of a road at a constant vehicle speed. Running resistance is equal to standard resistance if an automotive vehicle is driven to keep rolling over the surface of a flat road having 0% gradient at a constant vehicle speed. Running resistance increases and becomes greater than standard resistance if the automotive vehicle is accelerated to increase speed from the constant vehicle speed. The term "acceleration resistance" is herein used to mean this increment or difference in running resistance that has occurred due to acceleration. Running resistance is greater when the automotive vehicle is driven to keep rolling over the surface of a flat road having gradient greater than 0% at a constant vehicle speed than standard resistance for the same vehicle speed. The term "gradient resistance" is used to mean this increment or difference in running resistance.

JP-A 9-242862 discloses a driving force control system in which a speed ratio between an input shaft and an output shaft of an automatic transmission is controlled in response to road gradient, throttle opening degree, and vehicle speed. In order to estimate road gradient of a road, over which the vehicle is rolling, a road gradient torque (Tα) is determined by subtracting from a driving torque (To) a sum of a flat road running resistance torque (Tr) and an acceleration resistance torque (Tα). A characteristic of variation of flat road running resistance torque (Tr) against variation of vehicle speed is mapped. This mapped data are retrieved using a current reading point of vehicle speed to give a value of flat road running resistance torque (Tr).

JP-A 7-174042 discloses a driving torque control system for an automotive vehicle. This system adjusts a torque control element of an internal combustion engine in such a direction as to decrease a difference between an estimated driving torque and a target driving torque. Calculating product of an engine torque, a stall torque ratio of a torque converter, and a gear ratio of an automatic transmission gives the estimated driving torque. Retrieving a predetermined map gives the target driving torque against running condition of the vehicle. If there remains a portion of the difference between the estimated driving torque and the target driving torque, a braking torque is applied to cause a reduction in driving torque to assist in decreasing the estimated driving torque toward the target driving torque.

SUMMARY OF THE INVENTION

It is recognized as a potential problem that, at idling operation after operator releasing an accelerator pedal, a drop in detection accuracy of engine speed causes a considerable deviation of estimated value of driving torque from an actual value thereof. The deviation of the estimated driving torque might cause an error in estimated value of gradient resistance torque. Thus, a correction amount in driving force varies with varying estimated gradient resistance torque as shown by one dot chain line in FIG. 4. The profile of this one dot chain line shows that there occur various deviations of the driving force correction amount from the target value. The occurrence of such various deviations may deteriorate ride feel of the vehicle operator.

On ascending road, if the vehicle operator releases the accelerator pedal to make a turn, the driving force may be subjected to an excessive correction due to the above-mentioned variations because the correction depends only on the estimated gradient resistance torque. Such excessive correction may deteriorate ride feel of the vehicle operator.

It is also recognized as another potential problem that a portion of torque that is converted into heat due to friction within a brake upon depressing a brake pedal might be detected as an increase in gradient resistance torque. If so, the degree of deceleration becomes low and may not meet operator deceleration demand.

If it employs the technique of increasing brake pressure to reduce the estimated driving torque during operation of driving force control, the driving force is increased in response to erroneous detection of increase in gradient resistance torque when the brake pressure is increased during braking operation at ascending road.

Accordingly, an object of the present invention is to provide a driving force control free from the above-mentioned potential problems.

One feature of the driving force control system is to prevent occurrence of undesired variation in driving force at engine idling or at braking.

According to one aspect of the present invention, there is provided a driving force control system for an automotive vehicle having an accelerator pedal and a powertrain including an internal combustion engine, comprising:

a vehicle speed sensor detecting an operating parameter indicative of a speed of the vehicle and generating a vehicle speed signal indicative of the detected operating parameter;

an ordinary target driving force generator determining an ordinary target driving force in response to operator manipulation of the accelerator pedal and the vehicle speed indicated by the vehicle speed signal and generating an ordinary target driving force signal indicative of the determined ordinary target driving force, the ordinary target driving force being a predetermined target value of driving force required to keep the vehicle rolling over the surface of a flat road that has 0% gradient;

a running resistance increment generator determining an increment in running resistance from a standard resistance that is predetermined for the vehicle and generating a running resistance increment signal indicative of the determined increment in running resistance;

an idle switch detecting idle operation of the engine and generating an idle signal;

a brake switch detecting braking operation of the vehicle and generating a brake signal;

a corrected target driving force generator receiving the ordinary target driving force signal, the running resistance increment signal, the idle signal, and the brake signal, and determining corrected target driving force, and generating the determined corrected target driving force, the corrected target driving force generator being operative to restrain influence of the running resistance increment on the determined corrected target driving force when the idle signal and the brake signal indicate one of idle operation and brake operation.

DESCRIPTION OF THE PREFERRED EMBODIMENTS

Figure 1:
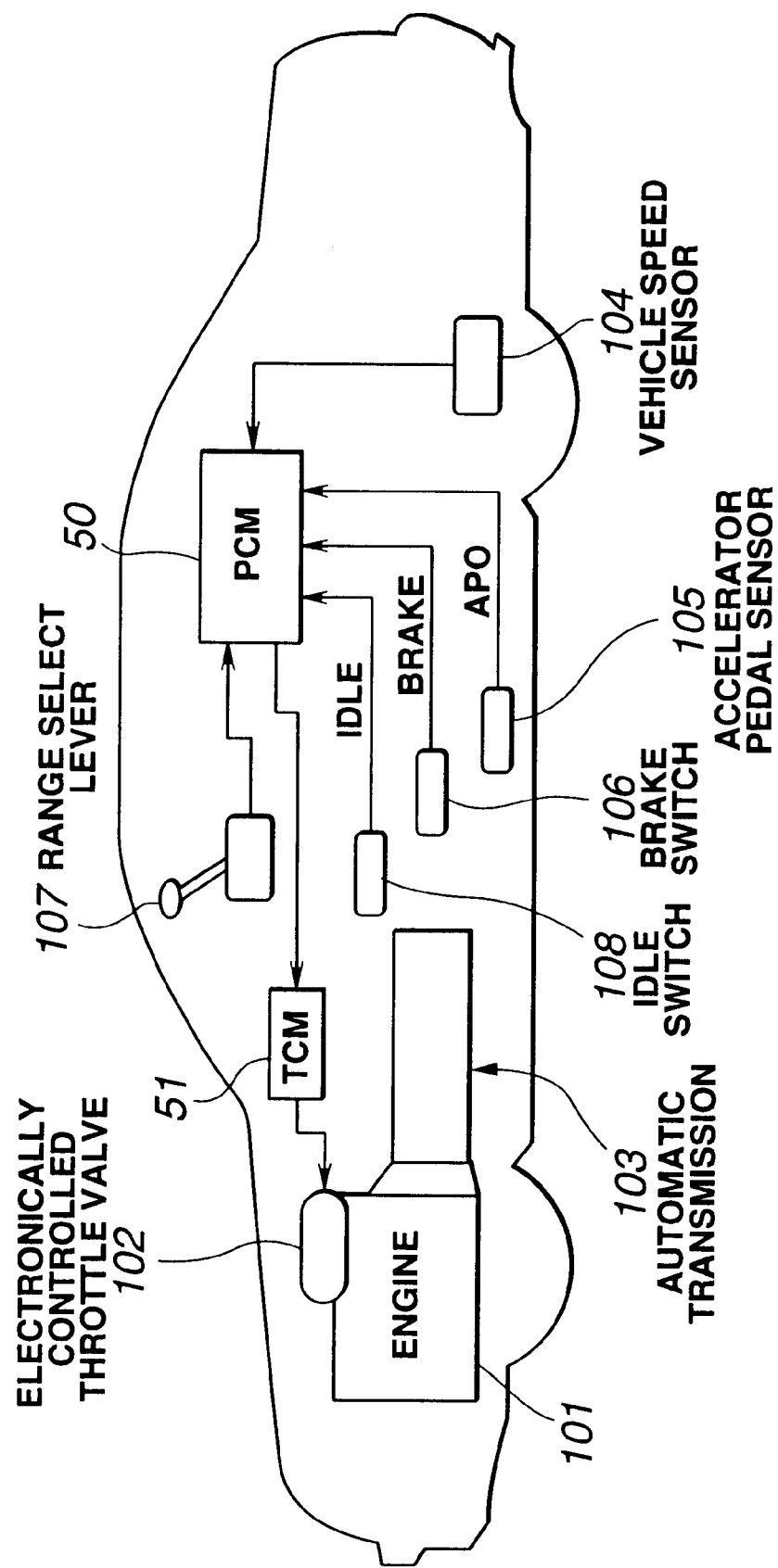
FIG. 1 is a block diagram of an automotive vehicle equipped with a powertrain control module (PCM) implementing the present invention.

Referring to the accompanying drawings, FIG. 1 illustrates an automotive vehicle having a powertrain including an internal combustion engine 101 with a throttle or throttle valve that opens in degrees. An automatic transmission 103 includes a torque converter. In a conventional manner, the automatic transmission 103 is drivingly connected to the engine 101 with the torque converter situated between the engine output shaft and the transmission input shaft. A speed ratio between revolution speed of the transmission input shaft and revolution speed of the transmission output shaft is variable. The reference numeral 50 indicates a powertrain control module (PCM). The PCM 50 controls output of the engine 101 and the speed ratio of the automatic transmission 103 to cause the power train to produce optimum driving force in response to running state.

An accelerator pedal sensor 105 detects degree of opening or depression of an accelerator pedal and generates an APO signal indicative of the detected opening degree. This sensor 105 serves as an input device to detect operator demand on movement of the vehicle relative to the surface of a road. An inhibitor switch detects which one of ranges is selected by a range selector lever 107 and generates a select signal indicative of the detected range selected. A vehicle speed sensor 104 detects revolution speed of the transmission output shaft as an operating parameter indicative of vehicle speed VSP and generates a vehicle speed signal indicative of the detected operating parameter. An input shaft revolution speed sensor, not shown, detects revolution speed of an input shaft of the transmission 103 and generates input shaft revolution speed signal indicative of the detected input shaft evolution speed IMPREV. The APO signal, select signal, vehicle speed signal, and input shaft revolution speed signal are fed to the PCM 50. The PCM 50 generates a fuel injection command and a spark timing command. In response to the fuel injection and spark timing commands, the engine 101 adjusts fuel injection quantity and spark timing. The PCM 50 also generates a ratio command. In response to the ratio command, the automatic transmission 103 adjusts the speed ratio. The PCM 50 adjusts a driving force of the vehicle using the fuel injection quantity command, spark timing command, and ratio command.

Disposed within an induction passage of the engine 101 is an electronically controlled throttle valve 102, which is opened by an actuator that is connected to a throttle control module (TCM) 51. In response to a throttle valve opening command signal from the PCM 50, the TCM 51 adjusts, via the actuator, the opening degree of the throttle valve 102.

The automatic transmission 103 is in the form of a continuously variable transmission (CVT) in which a ratio is continuously variable in response to the ratio command from the PCM 50. Multiplying a predetermined constant with vehicle speed VSP that is detected by the vehicle speed sensor 104 gives output shaft revolution speed OUPREV. Input shaft revolution speed IMPREV that is detected by the speed sensor 106 and output shaft revolution speed OUPREV are used to calculate a ratio of IMPREV to OUPREV. This calculated ratio is used as a speed ratio RATIO, i.e., RATIO =IMPREV/OUPREV, of the transmission 103. An input element of a ratio control mechanism of the CVT is activated in a direction to reduce a deviation of the ratio RATIO from the ratio command toward zero.

In order for the PCM 50 to recognize operating state of the vehicle, an idle switch 108 and a brake switch 106 are connected to the PCM 50 in addition to the vehicle speed sensor 105. The idle switch 108 detects idle operation of the engine 101 and generates a two-level IDLE signal In this example, the idle switch 108 determines that the engine is idling when the engine speed is lower than a predetermined value (1000 rpm for instance) and the width of the fuel injection pulse is less than a predetermined value. The IDLE signal assumes an OFF level when the accelerator pedal is depressed and an ON level when the engine idles after the accelerator pedal has been released to reduce the accelerator pedal opening degree toward zero. The brake switch 106 detects braking operation of the vehicle and generates a two-level BRAKE signal. The BRAKE signal assumes an ON level when the brake pedal is depressed and an OFF level when the brake pedal is released.

Figure 2:
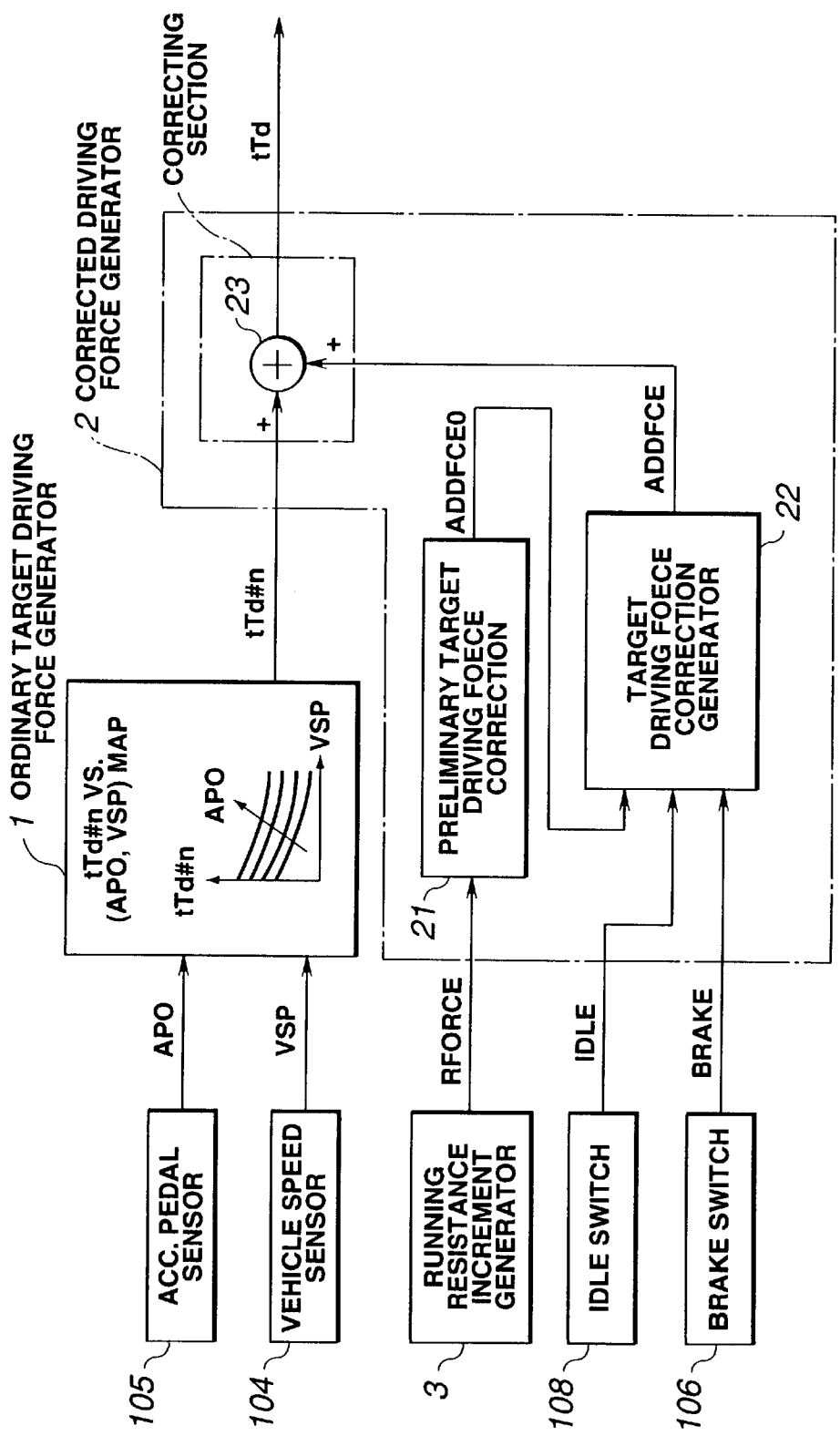
FIG. 2 is a control diagram illustrating a first preferred implementation of the present invention.

FIG. 2 is a block diagram illustrating one example of a driving force control performed within the PCM 50. Control strategy employed provides an increase of driving force in accordance with an increase in running resistance. Besides, the PCM 50 restrains the amount of correction in driving force in response to the IDLE signal and BRAKE signal from the idle switch 108 and the brake switch 106.

In FIG. 2, the reference numeral 1 designates an ordinary target driving force generator (OTDFG). The OTDFG 1 inputs information as to APO and VSP from the sensors 105 and 104, respectively. The OTDFG 1 stores a tTd#n vs. (APO, VSP) map. This map contains various values of tTd#n against various combinations of values of APO and values of VSP. The values of tTd#n are indicative of target values of driving force required to keep the vehicle rolling over the surface of a flat road that has 0% gradient. The OTDFG 1 performs a table look-up operation of the map using the detected values of APO and VSP to determine a value of tTd#n, and generates an ordinary target driving force signal indicative of the determined value of tTd#n. The reference numeral 3 designates a running resistance increment generator (RRIG). The RRIG 3 stores a predetermined standard running resistance, and determines an increase over the predetermined standard running resistance, and generates the determined increase as a running resistance increment RFORCE. The reference numeral 2 designates a corrected target driving force generator (CTDFG). The RFORCE, IDLE signal, and BRAKE signal are fed, as inputs, to the CTDFG 2. In the CTDFG 2, the ordinary target driving force tTd#n is corrected to give a corrected target driving force tTd.

The CTDFG 2 includes a driving force correction generator (DFCG) 21 that generates a preliminary target driving force correction ADDFCEQ, a driving force correction generator (DFCG) 22, and a correcting section 23. The DFCG 22 inputs ADDFCE0 and determines a target driving force correction ADDFCE in response to the IDLE and BRAKE signals. At the correcting section 23, ADDFCE is added to tTd#n to give corrected target driving force tTd.

Figure 3:
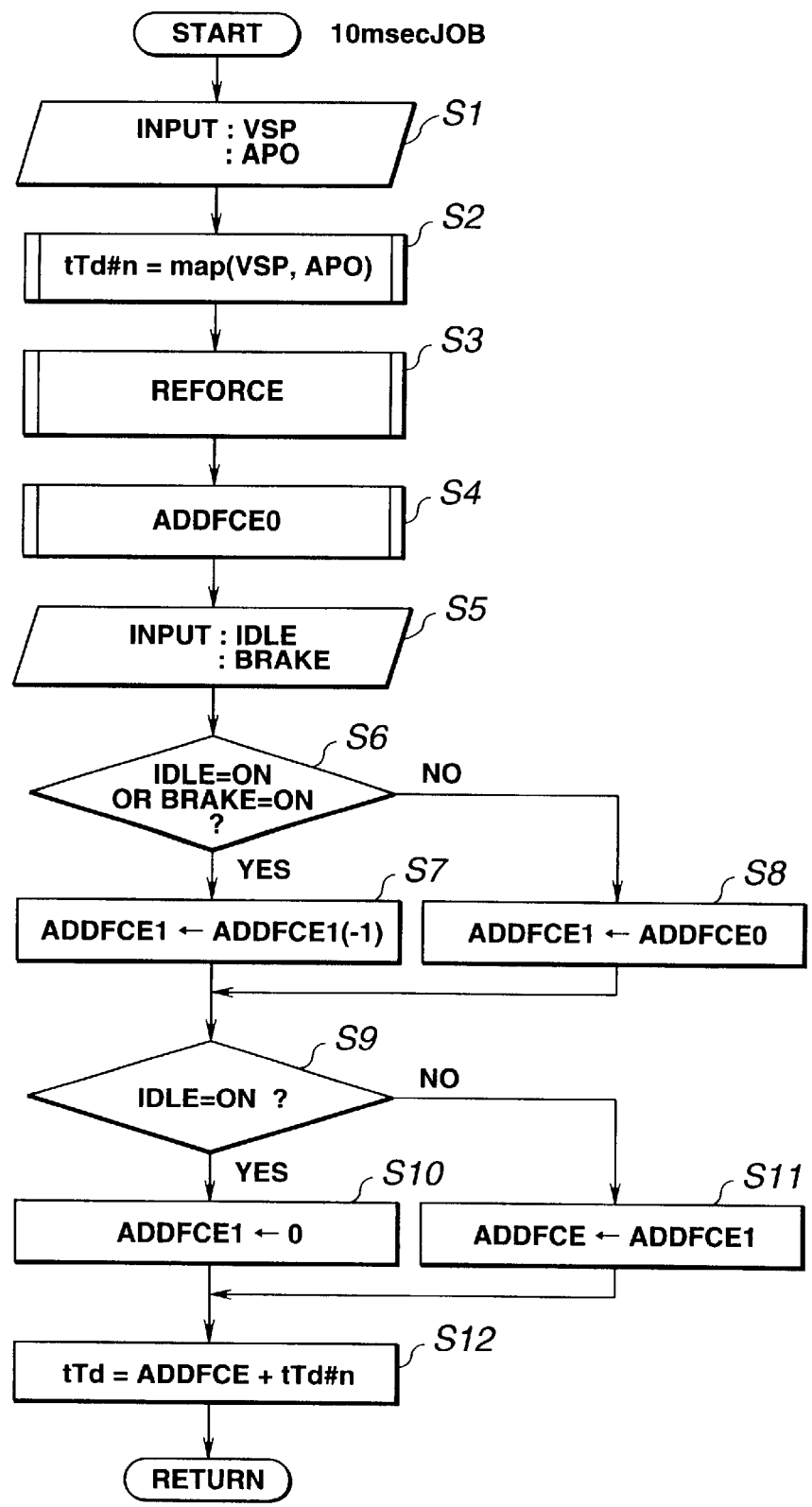
FIG. 3 is a flow chart of a driving force control routine illustrating the first preferred implementation.

FIG. 3 is a flow chart of a driving force control routine implementing the present invention. The PCM 50 includes, in the usual manner, a central processor unit (CPU), a random access memory (RAM), a read only memory (ROM), and an input/output (I/O) device. The ROM of the PCM 50 stores the control routine. The CPU of the PCM 50 executes the control routine at regular intervals of 10 milliseconds.

At step S1, the CPU inputs VSP and APO from the vehicle speed sensor 104 and accelerator pedal sensor 105. At step S2, the CPU performs a table look-up operation of the tTd#n vs., (APO, VSP) map (see FIG. 2) using VSP and APO to determine tTd#n.

At step S3, the CPU determines a running resistance increment RFORCE from the predetermined standard resistance. The job at step S3 corresponds to the running resistance increment generator 3. At step S4, the CPU determines a preliminary target driving force ADDFCE0 corresponding to RFORCE.

Next, at step S5, the CPU input IDLE and BRAKE signals from the idle switch 108 and the brake switch 106. At interrogation step S6, the CPU determines whether or not any one of IDLE signal and BRAKE signal is at ON level. If this is the case reflecting the situation where the accelerator pedal is released or the brake pedal is depressed, the routine proceeds to step S7. At step S7, the CPU set the previous value ADDFCE(−1) of ADDFCE0 as a variable ADDFCE1.

If, at step S6, the accelerator pedal is depressed with the brake pedal released, the routine proceeds to step S8. At step S8, the CPU sets ADDFCE0 as ADDFCE1.

At the next interrogation step S9, the CPU determines whether or not IDLE signal is at ON level. If this is the case, the routine proceeds to step S10. At step S10, the CPU sets 0 (zero) as ADDFCE. If this is not the case, the routine proceeds to step S11. At step S11, the CPU sets ADDFCE1 as ADDFCE.

At step S12, the CPU adds ADDFCE to tTd#n to determine tTd. The determined corrected target driving force tTd is used to adjust fuel injection quantity and/or ignition timing of the engine 101 and speed ratio of the automatic transmission 103.

In ordinary operating state where the operator depresses the accelerator pedal and releases the brake pedal, the preliminary target driving force correction ADDFCE0 that corresponds to the current running resistance increment RFORCE is used as the target driving force correction ADDFCE. Thus, the drving force is corrected in accordance with the running resistance increment RFORCE.

If the operator releases the accelerator pedal to render IDLE signal ON level, the routine proceeds to step S10 so that 0 (zero) is set as ADDFCE. Thus, the correction of tTd#n is suspended.

Figure 4:
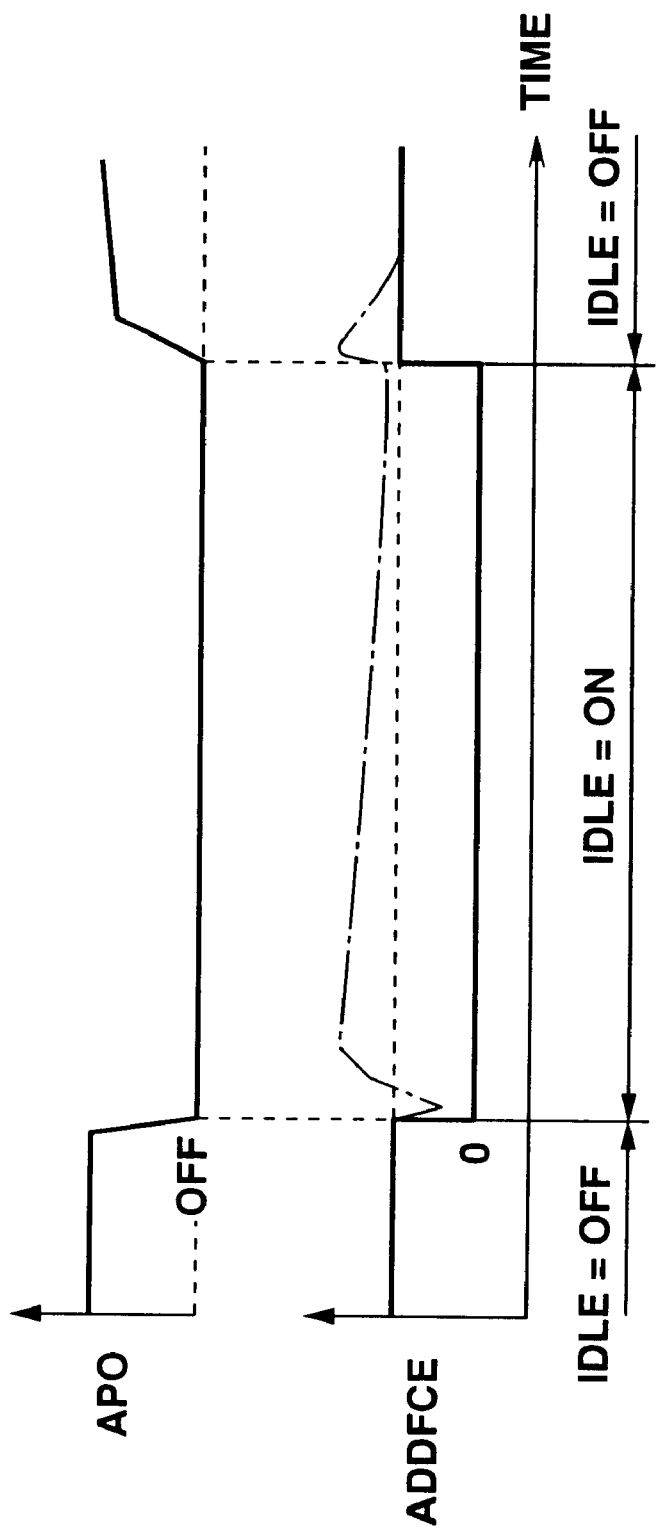
FIG. 4 is a timing chart of the first preferred implementation, illustrating variation of a target driving force correction ADDFCE at idle operation of the engine under an operating condition when actual running resistance increment due to road gradient, for example, is kept unaltered.

Referring to FIG. 4, it is seen that ADDFCE is kept equal to 0 (zero) and the correction of tTd#n is suspended during a period when the engine 101 is idling. In FIG. 4, one-dot chain line shows variation of ADDFCE if ADDFCE is kept equal to ADDFCE0 during the period. This variation of ADDFCE is due to estimation of driving force based on unreliable results from detecting the engine input speed at idling of the engine. According to the preferred implementation, the ADDFCE is kept at 0 (zero) and free from variation. The preferred implementation restrains excessive variation in driving force caused by the variation of ADDFCE, thus making it possible to provide coasting state immediately after the operator has released the accelerator pedal without imparting any unusual ride feel to the operator.

Figure 5:
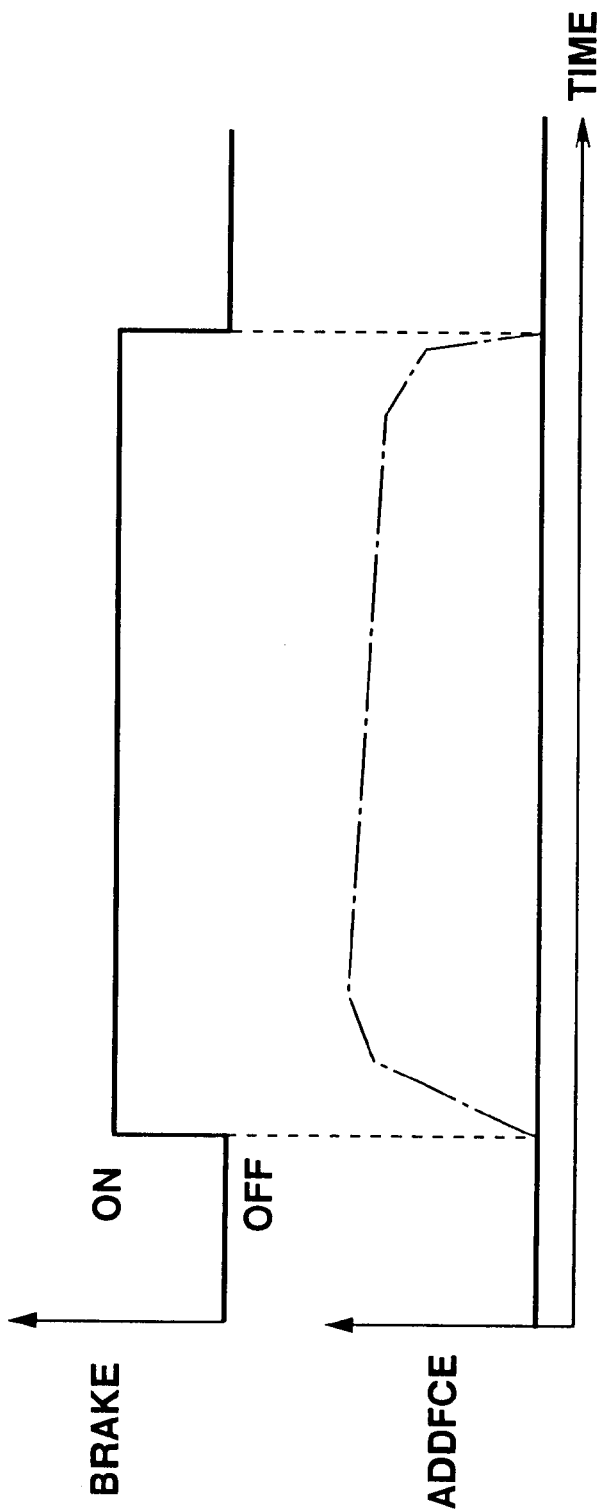
FIG. 5 is a timing chart of the first preferred implementation, illustrating variation of a target driving force correction ADDFCE at braking operation of the vehicle under an operating condition when actual running resistance increment due to road gradient, for example, is kept unaltered.

Referring to FIGS. 3 and 5, upon or immediately after the operator has depressed the brake pedal, the routine proceeds to step S7 and then to step S11. At step S7, the value of ADDFCE immediately before the BRAKE signal assumes ON level is set as the preceding value ADDFCE1(−1), and the ADDFCE is kept equal to this value over the period when the BRAKE signal assumes ON level.

The fully drawn line of FIG. 5 shows that ADDFCE is kept equal to the value of ADDFCE immediately before the initiation of braking operation over the period when the BRAKE signal stays at ON level. In FIG. 5, one-dot chain line shows the variation of excessive increase in ADDFCE due to recognition of an increase in braking torque as an increase in running resistance. This preferred implementation has prevented such excessive increase in ADDFCE, thus providing deceleration as much as expected by the operator.

From the preceding description, it is appreciated that, at idling, ADDFCE is kept equal to 0 (zero) to provide smooth ride feel without any variation in driving force, and, at braking, ADDFCE is kept equal to the preceding value immediately before the initiation of braking to provide deceleration as much as expected by the vehicle operator.

Although, in this example, ADDFEC is set equal to 0 (zero) at step S10, ADDFEC may be set equal to any value that is lower than the value of ADDFEC immediately before the IDLE signal assumes ON level.

Figure 6:
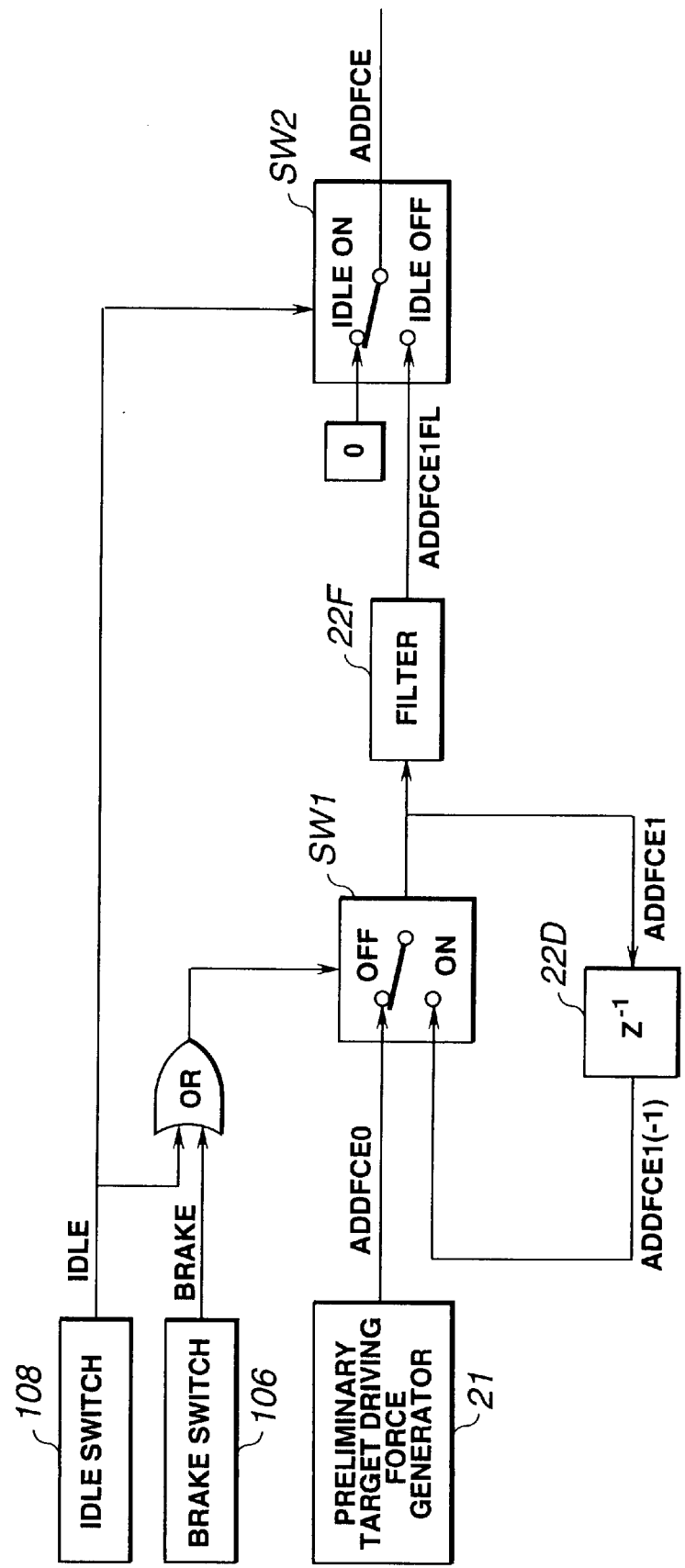
FIG. 6 is a control diagram illustrating a second preferred implementation according to the present invention.

FIG. 6 illustrates a second preferred implementation of the present invention. The second preferred implementation is substantially the same as the first preferred implementation except the structure of the TDFCG 22. The TDFCG shown in FIG. 6 includes a switch SW1. The IDLE signal from idle switch 108 and BRAKE signal from brake switch 106 are fed to two inputs of an OR logic gate. Output of this OR logic gate is fed to the switch SW1. This output has two levels, namely ON and OFF levels. In response to the output of the OR logic gate, the switch SW1 assumes OFF position when the output of the OR logic gate is at OFF level, and assumes ON position when the output of the OR logic gate is at ON level. The preliminary target running force increment ADDCEO is fed, as one input, to the switch SW1. Fed, as the other input, to the switch SW1 is the preceding value ADDFCE(-1) of a variable ADDFCE1 outputted by the switch SW1. A delay element 22D is provided to keep supplying the preceding value ADDFEC(-1). In the OFF position, the switch SW1 sets ADDFCE0 as ADDFCE1. In the ON position, the switch SW1 sets ADDFCE1(-1) as ADDFCE0.

The variable ADDFCE1 is fed to a filter 22F. Output ADDFCE1FL of the filter 22F is fed, as one input, to a switch SW2. A zero (0) is fed, as the other input, to the switch SW2. The IDLE signal is fed also to the switch SW2. In response to the IDLE signal, the switch SW2 assumes an IDLE OFF position when the IDLE signal is at OFF level and an IDLE ON position when the IDLE signal is at ON level. In IDLE OFF position, the switch SW2 sets ADDFCE1FL as target driving force correction ADDFCE. In IDLE ON position, the switch SW2 sets 0 (zero) as ADDFCE.

Similarly to the operation of the first preferred implementation, the target driving force correction ADDFCE drops down to 0 (zero) at idling and becomes fixed at the preceding value ADDFCE1(-1) at braking.

At braking, the switch SW1 assumes ON position with the switch SW2 left at OFF position so that ADDFCE is kept equal to the preceding value ADDFCE1(-1) of the preliminary target driving force correction ADDFCE0 immediately before the initiation of braking operation. Subsequently, at idling, both of the switches SW1 and SW2 assume ON positions, respectively. The switch SW2 sets ADDFCE equal to 0 (zero). The switch SW1 holds the preceding value ADDFCE1 (-1) immediately before the IDLE signal has turned to ON level.

Upon or immediately after a change from the idling or braking operation to normal operation, both of the switches SW1 and SW2 shift to OFF positions, respectively. Then, the switch SW1 outputs ADDFCE0 as ADDFCE1, and the switch SW2 outputs ADDFCE1FL as ADDFCE.

The filter 22F controls variation of ADDFCE from the level of ADDFCE(-1) to the level of ADDFCE0, so that the driving force may be corrected without deteriorating ride feel during a shift from the idling or braking operation to the normal operation.

Upon concurrent occurrence of release of the accelerator pedal and depression of the brake pedal, the switch SW2 assumes ON position in response to the ON level IDLE signal from the idle switch 108. Then, ADDFCE is lowered to 0 (zero).

Figure 7:
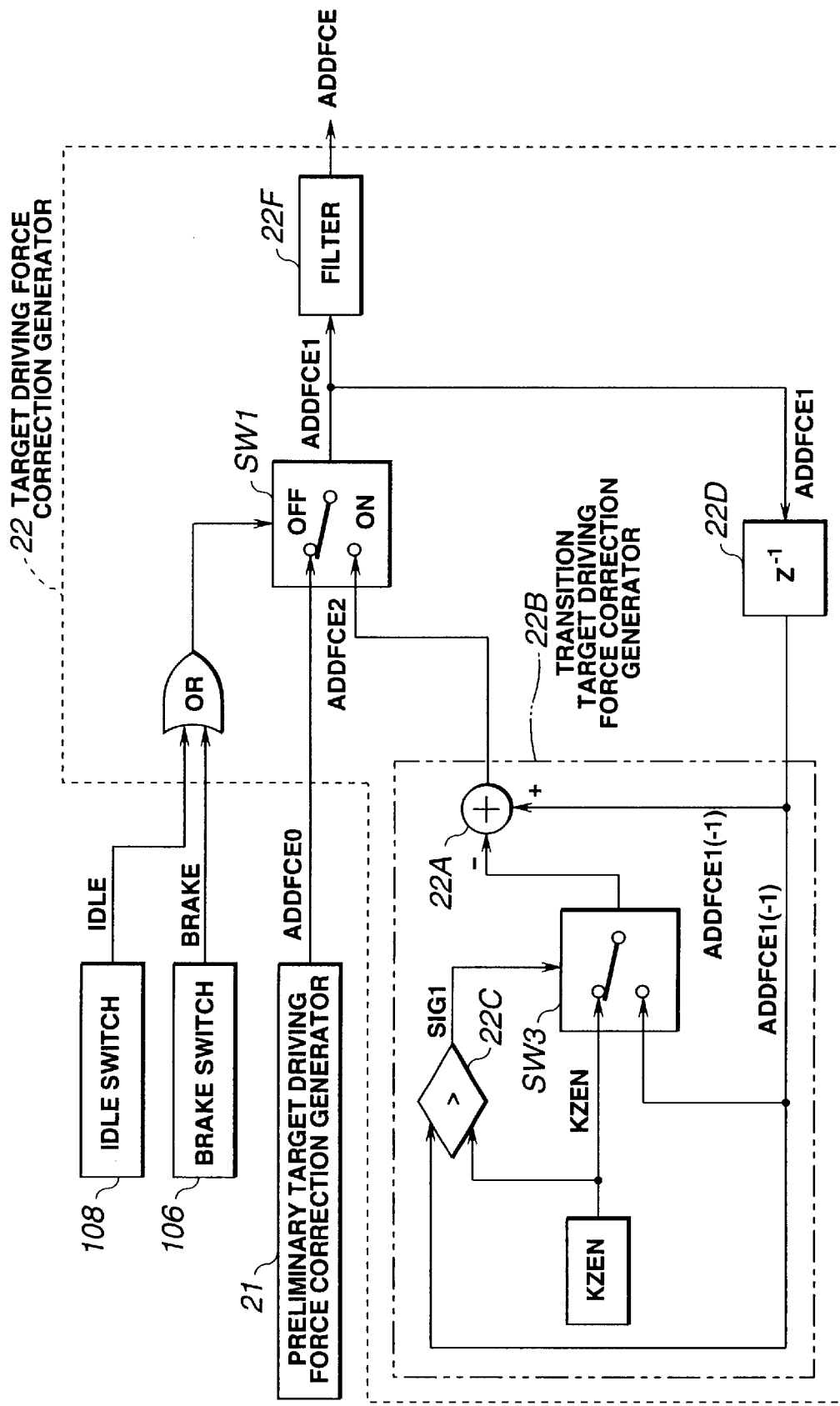
FIG. 7 is a control diagram illustrating a third preferred implementation according to the present invention.

FIG. 7 illustrates a third preferred implementation of the present invention. The third preferred implementation is substantially the same as the second preferred implementation (see FIG. 6) except the elimination of the switch SW2 and the provision of a transition target driving force correction generator (TTDFCG) 22B between the delay element 22D and the switch SW1. In FIG. 7, the output of a filter 22F, which has been named ADDFCE1FL in FIG. 6, is set as ADDFCE. The preceding value ADDFCE(-1) immediately before the initiation of idle or braking operation is fed, as input, to the TTDFCG 22B. The TTDFCG 22B reduces the ADDFCE(-1) by a predetermined decrement KZEN at regular intervals.

The TTDFCG 22B includes a summation point 22A, a comparator 22C, and a switch SW3. The comparator 22C determines whether or not ADDFCE1(-1) is greater than KZEN and generates a two-level signal SIG1. The SIG1 is at 1 level when ADDFCE1(-1) is greater than KZEN and at 0 level when ADDFCE1 (-1) is less than or equal to KZEN. The SIG1 is applied to the switch SW3. The KZEN is fed, as one input, to the switch SW3. The ADDFCE1(-1) is fed, as the other input, to the switch SW3. An output of the switch SW3 is fed to the summation point 22A. The ADDFCE1(-1) is fed to the summation point 22A. An output ADDFCE2 of the summation point 22A is fed to the "ON" input terminal of a switch SW1.

In brevity, the comparator 22C outputs SIG1=1 when ADDFCE1 (-1)>KZEN, or SIG1=0 when ADDFCE1(-1) ≦KZEN.

The switch SW3 output KZEN when SIG1=1 or ADDFCE1(-1) when SIG1=0.

During idle or braking operation, the switch SW1 assumes ON position, allowing the use of ADDFCE2 as its output ADDFCE1

Immediately after the initiation of idle or braking operation, SIG1 of the comparator 22C is at 1 level. During the time when SIG1=1, the predetermined value KZEN is subtracted from ADDFCE1(-1) at each control time, so that ADDFCE2 and thus ADDFCE1 decreases by the predetermined value KZEN at each control time as time passes.

Subsequently when ADDFCE1(-1) becomes lower than KZEN, the level of SIG1 changes to 0, causing the switch SW3 to use ADDFCE1(-1) as its output. The summation point 22A makes calculation ADDFCE1(-1)-ADDFCE1(-1)=0 and thus provides 0 as its output.

Figure 9:
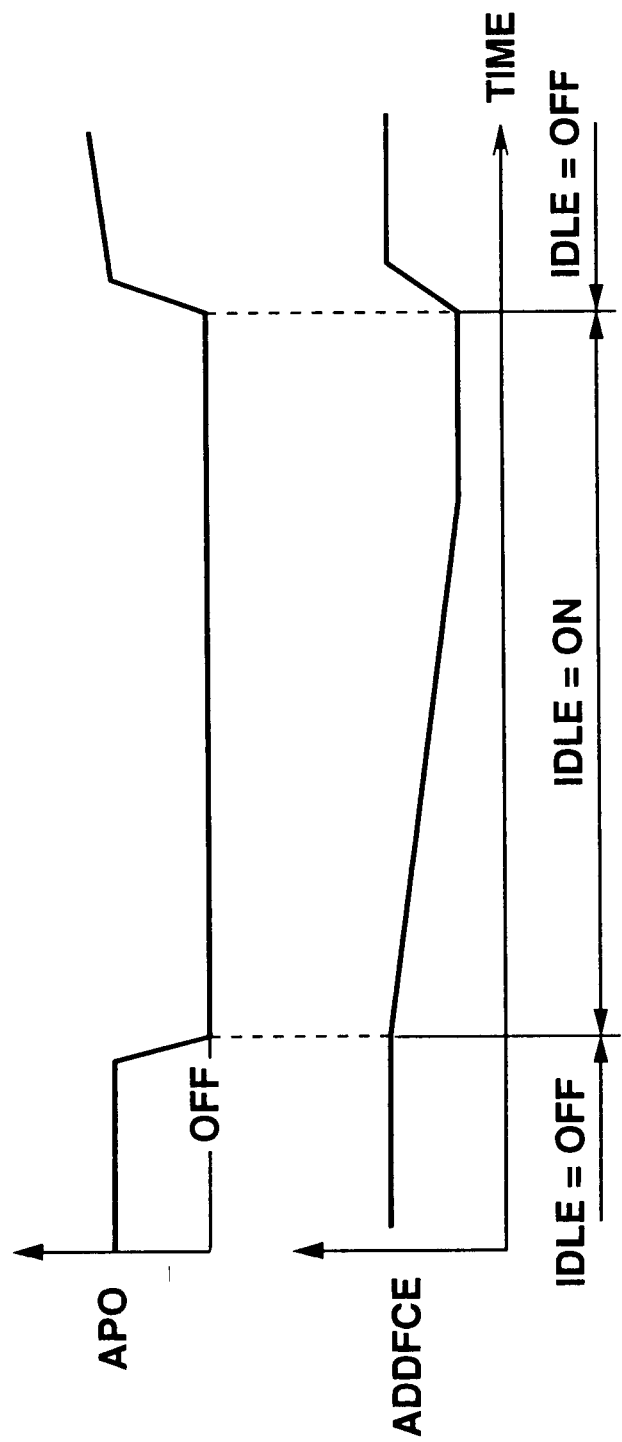
FIG. 9 is a timing chart of the third preferred implementation, illustrating variation of a target driving force correction ADDFCE at idle operation of the engine under an operating condition when actual running resistance increment due to road gradient, for example, is kept unaltered.

Referring to FIG. 9, the fully drawn line shows ADDFCE decreasing gradually toward zero immediately after IDLE signal changes from OFF level to ON level. ADDFCE becomes 0 (zero) upon elapse of a sufficient time after the initiation of idle operation.

The variation of ADDFCE immediately after the initiation of braking operation is the same as the variation shown in FIG. 9.

Figure 8:
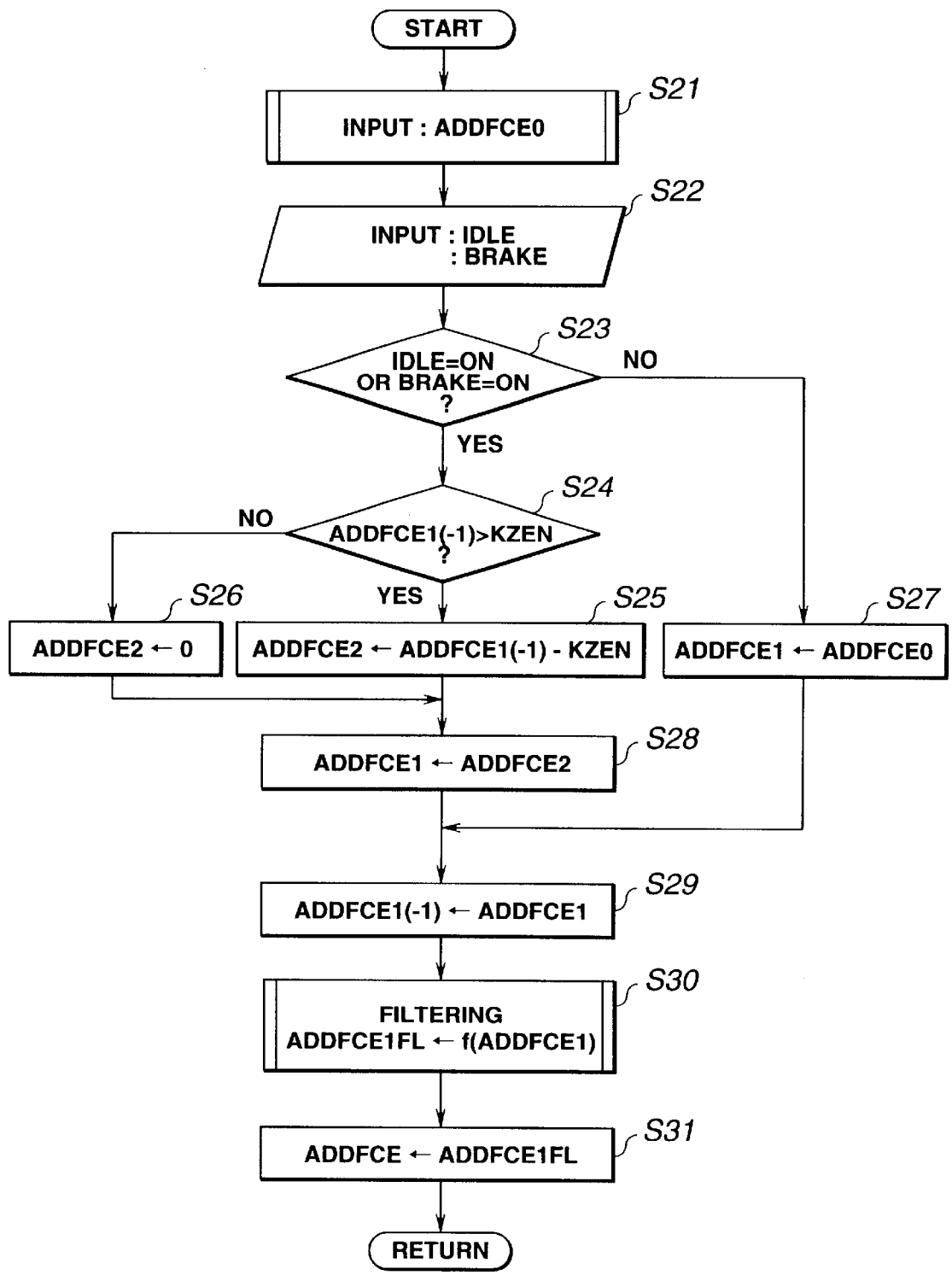
FIG. 8 is a flow chart of a driving force control routine illustrating the third preferred implementation.

FIG. 8 is a flow chart of a control routine illustrating the third preferred implementation of the present invention. The CPU of the PCM 50 executes this control routine at regular intervals of 10 milliseconds.

At step S21, the CPU inputs ADDFCE0. At step S22, the CPU inputs IDLE and BRAKE. At the next interrogation step S23, the CPU determines whether or not IDLE is at ON level or BRAKE is at ON level.

If this is the case, the routine proceeds to step S24. If this is not the case, the routine proceeds to step S27. At step S27, the CPU sets ADDFCE0 as ADDFCE1.

At interrogation step S24, the CPU determines whether or not ADDFCE1 (-1) is greater than KZEN. If this is the case, the routine proceeds to step S25. If this is not the case, the routine proceeds to step S26. At step S26, the CPU sets 0 (zero) as ADDFCE2.

At step S25, the CPU makes a subtraction of KZEN from ADDFCE1(-1) to give ADDFCE2. After step S25 or S26, the routine proceeds to step S28. At step S28, the CPU sets ADDFCE2 as ADDFCE1. At the next step S29, the CPU sets ADDFCE1 as ADDFCE1(-1).

At step S30, the CPU makes filtering of ADDFCE1 to give ADDFCE1FL. At step S31, the CPU sets ADDFCE1FL as ADDFCE.

Repeating execution of this routine will give a gradual reduction in ADDFCE immediately after initiation of idle or braking operation, thus eliminating deviation from target driving force suitable for release of accelerator pedal.

In the preceding description, the running resistance increment generator (RRIG) 3 and preliminary target driving force generator (PTDFG) 21 are described briefly in connection with FIG. 2. For full understanding of the PRIG 3 and PTDFG 21, reference should be made to a pending U.S. patent application No. 09/513,459 (filed Mar. 2, 2000), filed by the inventors, entitled "Process of Forming Standard Resistance Values and Vehicle Control Using Same", and claims priority based on Japanese Patent Application No. 11-58291 filed in Japan on Mar. 5, 1999. This pending United States Patent Application is hereby incorporated by reference in its entirety and commonly assigned herewith. Particular reference is made to FIG. 2 illustrating a driving torque generator (DTG) 2, a standard resistance generator 3, and a summation point to make subtraction of RLDTRQ from TRQALL to give RESTRQ. This RESTRQ corresponds to RFORCE that is generated by the RRIG 3 used in this application. Particular reference is also made to a driving force correction generator (DFCG) 41 and its description of the incorporated United States Patent Application. This DFCG 41 corresponds in operation to the PTDFC 21 used in this application. From the description as to DTG 2 of the incorporated United States Patent Application, it is noted that the detected engine speed NRPM is used as an input to an engine torque generator (ETG) 21 and thus the RESTRQ reflects variation in NRPM at engine idle operation or at braking operation. The present invention is advantageously usable with the case where the detected engine speed is used in determining the running resistance increment (RFORCE).

The above-identified United States Patent Application, which has been incorporated by reference, has a corresponding European Patent Application that claims priority based on Japanese Patent Application No. 11-58291.

While the present invention has been particularly described in conjunction with the preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The content of disclosure of Japanese Patent Application No. 11-69523, filed Mar. 16, 1999 is hereby incorporated by reference in its entirety.

What is claimed is:

1. A driving force control system for an automotive vehicle having an accelerator pedal and a powertrain including an internal combustion engine, comprising:

a vehicle speed sensor detecting an operating parameter indicative of a speed of the vehicle and generating a vehicle speed signal indicative of said detected operating parameter;

an ordinary target driving force generator determining an ordinary target driving force in response to operator manipulation of the accelerator pedal and said vehicle speed indicated by said vehicle speed signal and generating an ordinary target driving force signal indicative of said determined ordinary target driving force, said ordinary target driving force being a predetermined target value of driving force required to keep the vehicle rolling over the surface of a flat road that has 0% gradient;

a running resistance increment generator determining an increment in running resistance from a standard resistance that is predetermined for the vehicle and generating a running resistance increment signal indicative of said determined increment in running resistance;

an idle switch detecting idle operation of the engine and generating an idle signal; a brake switch detecting braking operation of the vehicle and generating a brake signal;

a corrected target driving force generator receiving said ordinary target driving force signal, said running resistance increment signal, said idle signal, and said brake signal, and determining corrected target driving force, and generating said determined corrected target driving force, said corrected target driving force generator being operative to restrain influence of said running resistance increment on said determined corrected target driving force when said idle signal and said brake signal indicate one of idle operation and brake operation.

2. The driving force control system as claimed in claim 1, wherein said corrected target driving force generator includes:

a preliminary target driving force correction generator determining a correction amount in target driving force in response to said running resistance increment signal and generating a preliminary target driving force correction signal indicative of said determined correction amount; and a target driving force correction generator receiving said preliminary target driving force correction signal, determining a target driving force correction, and generating a target driving force correction signal indicative of said determined target driving force correction, said target driving force correction generator being operative to correct said preliminary target driving force correction signal in determining said target driving force correction when said idle signal and said brake signal indicate one of idle operation and brake operation.

3. The driving force control system as claimed in claim 2, wherein said target driving force correction generator is operative to set said driving force correction equal to said preliminary driving force correction unless said idle signal and brake signal indicate one of idle operation and brake operation.

4. The driving force control system as claimed in claim 2, wherein, when said idle signal indicates idle operation, said target driving force correction generator is operative to set said target driving force correction at a level lower than said preliminary target driving force correction signal.

5. The driving force control system as claimed in claim 2, wherein, when said idle signal indicates idle operation, said target driving force correction generator is operative to set said target driving force correction at a level including zero.

6. The driving force control system as claimed in claim 2, wherein, when said idle signal fails to indicate idle operation after said idle signal has been indicating the idle operation, said target driving force correction generator is operative to set said target driving force correction equal to said preliminary target driving force correction signal.

7. The driving force control system as claimed in claim 2, wherein, when said idle signal indicates idle operation, said target driving force correction generator is operative to decrease said target driving force correction toward zero as time passes immediately after said idle signal has begun indicating the idle operation.

8. The driving force control system as claimed in claim 2, wherein, when said brake signal fails to indicate brake operation after said brake signal has been indicating the brake operation, said target driving force correction generator is operative to set said target driving force correction equal to said preliminary target driving force correction signal.

9. The driving force control system as claimed in claim 2, wherein, when said brake signal indicates braking operation, said target driving force correction generator is operative to decrease said target driving force correction toward zero as time passes immediately after said brake signal has begun indicating the braking operation.

10. A driving force control method for an automotive vehicle having an accelerator pedal and a powertrain including an internal combustion engine, comprising:

detecting an operating parameter indicative of a speed of the vehicle and generating a vehicle speed signal indicative of said detected operating parameter;

determining an ordinary target driving force in response to operator manipulation of the accelerator pedal and said vehicle speed indicated by said vehicle speed signal and generating an ordinary target driving force signal indicative of said determined ordinary target driving force, said ordinary target driving force being a predetermined target value of driving force required to keep the vehicle rolling over the surface of a flat road that has 0% gradient;

determining an increment in running resistance from a standard resistance that is predetermined for the vehicle and generating a running resistance increment signal indicative of said determined increment in running resistance;

detecting idle operation of the engine and generating an idle signal;

detecting braking operation of the vehicle and generating a brake signal;

determining corrected target driving force in response to said running resistance increment signal, and generating said determined corrected target driving force; and restraining influence of said running resistance increment on said determined corrected target driving force when said idle signal and said brake signal indicate one of idle operation and brake operation.

11. A driving force control system for an automotive vehicle having an accelerator pedal and a powertrain including an internal combustion engine, comprising:

a vehicle speed sensor detecting an operating parameter indicative of a speed of the vehicle and generating a vehicle speed signal indicative of said detected operating parameter;

an idle switch detecting idle operation of the engine and generating an idle signal;

a brake switch detecting braking operation of the vehicle and generating a brake signal; and a powertrain control module, which is so programmed as to be operative to determine an ordinary target driving force in response to operator manipulation of the accelerator pedal and said vehicle speed indicated by said vehicle speed signal and to generate an ordinary target driving force signal indicative of said determined ordinary target driving force, said ordinary target driving force being a predetermined target value of driving force required to keep the vehicle rolling over the surface of a flat road that has 0% gradient;

said powertrain control module being operative to determine an increment in running resistance from a standard resistance that predetermined for the vehicle and generating a running resistance increment signal indicative of said determined increment in running resistance;

said powertrain control module being operative to receive said ordinary target driving force signal, said running resistance increment signal, said idle signal, and said brake signal, and to determine corrected target driving force, and to generate said determined corrected target driving force;

said powertrain control module being operative to restrain influence of said running resistance increment on said determined corrected target driving force when said idle signal and said brake signal indicate one of idle operation and brake operation.

* * * * *